Jan. 31, 1967   D. F. QUEEN   3,301,220
HUMMINGBIRD FEEDER
Filed Sept. 30, 1965
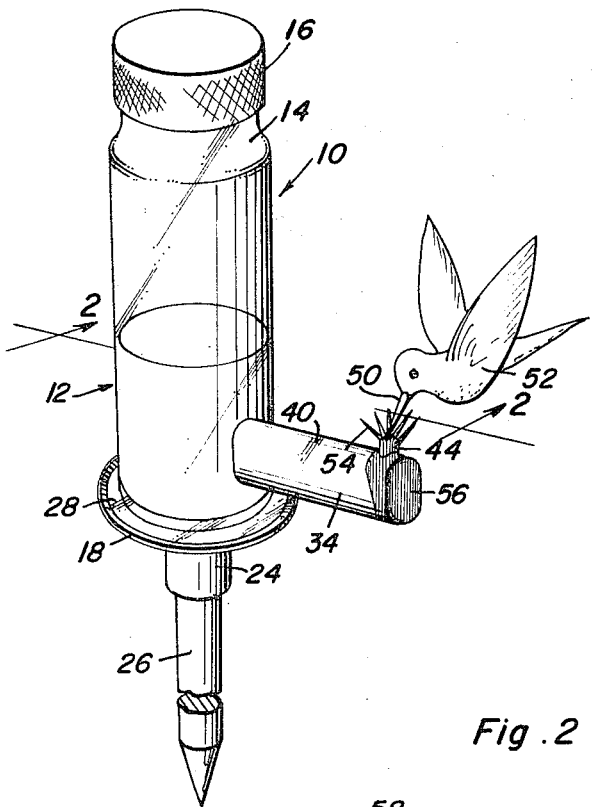
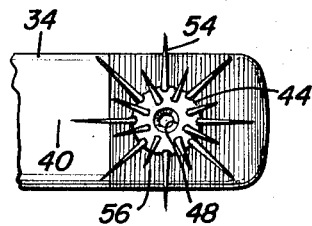
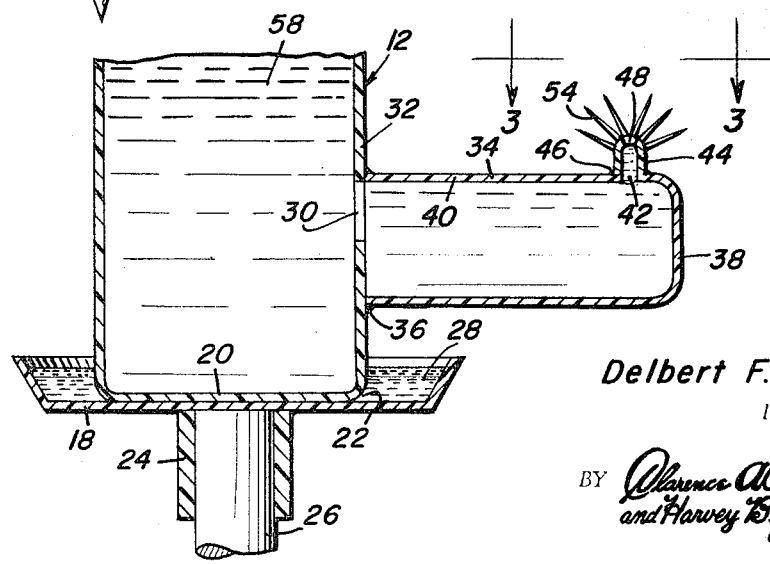
Delbert F. Queen
INVENTOR.

United States Patent Office 3,301,220
Patented Jan. 31, 1967

3,301,220
HUMMINGBIRD FEEDER
Delbert F. Queen, Richmond Dale, Ohio 45673
Filed Sept. 30, 1965, Ser. No. 491,578
4 Claims. (Cl. 119—77)

This invention relates to a novel and useful hummingbird feeder and more specifically to an apparatus that is designed specifically to attract and feed hummingbirds. The feeder includes a small liquid food reservoir disposed atop and communicated with a generally horizontally extending hollow arm portion of a larger liquid food reservoir. The smaller reservoir has an opening in its upper end adapted to receive therethrough the beak of a hummingbird and the small reservoir is provided with outwardly projecting prongs about the opening in the upper portion thereof acting as guards to prevent bees, which are natural feeding enemies of the hummingbird, from feeding at the feeder. The longer beaks of the hummingbirds enable a hummingbird to insert his beak within the opening formed in the smaller reservoir while the head and all but the end of the beak of the hummingbird feeding at the feeder remain outwardly of the free ends of the prongs.

In addition, the smaller reservoir is positioned relative to the larger reservoir in a manner such that the level of liquid food within the smaller reservoir may be maintained substantially constant at a predetermined level. Still further, the hummingbird feeder of the instant invention is adapted to be supported from atop a post depending from the larger reservoir portion of the body and the larger reservoir includes means for preventing ants from traveling up the support post of the feeder and moving across the outer surfaces of the feeder to the hummingbird beak receiving opening formed in the upper portion of the smaller reservoir of the feeder, ants also being feeding enemies of hummingbirds.

The main object of this invention is to provide a hummingbird feeder which will provide a means whereby bird lovers may attract and feed hummingbirds.

Another object of this invention is to provide a hummingbird feeder constructed in a manner whereby a hummingbird attracted thereto and feeding therefrom may be clearly observed by the person or persons who have erected the hummingbird feeder.

Yet another object of this invention is to provide a hummingbird feeder constructed in a manner whereby the natural feeding enemies of the hummingbird, ants and bees, will be prevented from gaining access to the liquid food disposed within the feeder for the hummingbird.

Yet another object of this invention is to provide a hummingbird feeder constructed in a manner whereby its appearance will attract hummingbirds.

A final object of this invention to be specifically enumerated herein is to provide a hummingbird feeder in accordance with the preceding objects which will conform to conventional forms of manufacture, be of simple construction and easy to erect so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the hummingbird feeder of the instant invention with portions of the support standard of the feeder being broken away;

FIGURE 2 is an enlarged fragmentary vertical sectional view taken substantially upon a plane indicated by the section line 2—2 of FIGURE 1; and FIGURE 3 is a fragmentary plan view of a portion of the feeder as seen from the section line 3—3 of FIGURE 2.

Referring now more specifically to the drawings, the numeral 10 generally designates the hummingbird feeder of the instant invention. The feeder 10 includes a large reservoir defined by an upstanding elongated container generally referred to by the reference numeral 12. The container 12 includes an externally threaded diametrically reduced upper end neck portion 14 to which a threaded cap assembly 16 is threadedly secured. A shallow dish 18 is secured to the bottom 20 of the container 12 in any convenient manner such as by a bonding material 22 and is larger in diameter than the lower end of the container. The dish 18 includes a depending cylindrical fitting 24 in which the upper end of a support post or column 26 is telescopically and removably secured. The dish 18 has a quantity of an ant repellent fluid 28 such as oil disposed therein and which evaporates slowly and will therefore not have to be replenished too often.

The container 12 has an opening 30 formed in one side wall 32 thereof a spaced distance above the bottom 20 and one end of a horizontally elongated and tubular support arm 34 is secured to the wall 32 about the opening 30 in any convenient manner such as by a bonding agent 36. The support arm 34 is closed at its outer end by means of an integral end wall 38 and it may be seen from FIGURE 2 of the drawings that the support arm 34 is substantially horizontally disposed.

The top wall 40 of the hollow support arm 34 has an opening formed therein and the open lower end of a small liquid food reservoir 44 is secured to the top or upper wall 40 about the opening 42 in any convenient manner such as by a bonding agent 46. The upper end of the small reservoir 44 has an outlet opening 48 formed therein adapted to receive therethrough the beak portion 50 of a hummingbird 52 and the upper portion of the small reservoir 44 is also provided with a plurality of outwardly projecting prongs 54 which radiate outwardly from the upper portions of the reservoir 44 disposed about the opening 48.

Still further, the free end portion of the hollow support arm 34 has a brilliant colored coating 56 applied thereto for attracting hummingbirds.

In operation, a quantity of liquid food 58 is placed within the large reservoir 12 after removing the cap 16. After the cap 16 is again tightened so as to make the upper end of the reservoir 12 airtight, the large reservoir 12 may be replaced upon the top of the post or standard 26. The quantity of oil 28 may then be replenished in the dish or plate 18. As a hummingbird projects his long beak down through the opening 48 and drinks some of the liquid food 58 within the small reservoir 44, air is admitted into the small reservoir 44. As the liquid level within the small reservoir 44 drops down to the upper portion of the hollow support arm 34, a portion of the air within the upper portion of the hollow support arm 34 will move toward and enter the large reservoir 12 through the opening 30 formed in the side wall 32 thereof thereby reducing the vacuum in the upper portion of the large reservoir 12 and allowing a quantity of the liquid food 58 to pass from the reservoir 12 and into the hollow support arm 34 to again raise the level of the liquid food 58 in the small reservoir 44.

As previously set forth, the quantity of oil 28 within the plate or dish 18 prevents ants from climbing up the post 26 and gaining access to the upper portion of the small reservoir 44 and the prongs 54 prevent bees from using the feeder. Further, the bright colored coating 56 on the free end of the support arm 34 acts as an attraction for hummingbirds.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bird feeder for dispensing liquid food to hummingbirds, said feeder comprising a large hollow reservoir including a filler opening in an upper portion thereof and an airtight removable closure for said opening, a laterally projecting hollow support arm having a closed outer end carried by a lower portion of said large reservoir and communicated with the interior of the latter, a small hollow reservoir secured to an upper portion of said support arm with a lower portion of said small reservoir communicated with the interior of said upper portion of said support arm, a small hummingbird bill receiving opening formed in an upper portion of said small reservoir, and a plurality of outwardly radiating prongs carried by the portions of said small reservoir disposed about the hummingbird bill receiving opening in said small reservoir, the point of communication of said small reservoir with said hollow support arm being generally horizontally aligned with the area of communication of said support arm with said large reservoir, said large reservoir including means defining an open top annular liquid receiving area disposed beneath said support arm adapted to have a quantity of slow evaporating ant repellent liquid disposed therein, said annular liquid receiving area being defined by a dish secured to the bottom of said large reservoir and projecting outwardly from all sides of the latter, said dish including an upstanding tubular fitting dependingly supported therefrom, an upright support post, the upper end of said support post being removably telescopingly engaged in said fitting.

2. The combination of claim 1 wherein said large reservoir includes a neck portion on its upper end opening upwardly and defining said filler opening, said closure cover being threadedly engaged with said neck portion.

3. The combination of claim 2 wherein the outer free end of said support arm includes a bright colored coating adjacent said small reservoir adapted to attract hummingbirds.

4. A bird feeder for dispensing liquid food comprising a large liquid reservoir adapted to have a quantity of liquid disposed therein and including a constant liquid level fountain-type small feeding reservoir disposed to one side of said large reservoir and in liquid communication with the large reservoir to receive liquid therefrom in a manner maintaining the liquid level in the small reservoir at the same general level, said small reservoir including a small bird bill receiving opening therein, said large reservoir including means defining an open top annular liquid receiving area disposed about the lower end of the large reservoir below said small reservoir and adapted to have a quantity of slow evaporating ant repellent liquid disposed therein, said annular liquid receiving area being defined by a member carried by a lower portion of said reservoir defining an annular trough extending circumferentially about the lower portion of said large reservoir and projecting outwardly from all sides of the latter, said feeder including a fitting depending below the lower end of said large reservoir and said annular trough, an upright support post, the upper end of said support post being removably telescopingly engaged with said fitting.

References Cited by the Examiner

UNITED STATES PATENTS

| 975,607 | 11/1910 | Duncan | 119—77 |
| 1,055,624 | 3/1913 | Enos | 119—77 |
| 1,450,494 | 4/1923 | Eummelen | 119—18 |
| 2,570,733 | 10/1951 | Thomas | 119—72 |
| 2,677,350 | 5/1954 | Prestidge et al. | 119—61 |
| 3,125,069 | 3/1964 | Fowler | 119—51 |

SAMUEL KOREN, *Primary Examiner.*

HUGH R. CHAMBLEE, *Examiner.*